United States Patent

Godshalk et al.

Patent Number: 5,384,646
Date of Patent: Jan. 24, 1995

[54] MARKING ENGINE FOR GREY LEVEL PRINTING HAVING A HIGH PRODUCTIVITY IMAGE DATA PROCESSING MODE

[75] Inventors: Russell L. Godshalk, Hilton; Raymond E. Maslinski, Rochester; Frank L. Muster, Rochester; Lawrence B. Telle, Rochester; Thomas J. Wetzel, Rochester, all of N.Y.

[73] Assignee: Eastman Kodak Company, Rochester, N.Y.

[21] Appl. No.: 982,546

[22] Filed: Nov. 27, 1992

[51] Int. Cl.6 .............................................. H04N 1/40
[52] U.S. Cl. ..................................... 358/448; 358/443; 358/426; 358/444; 358/467; 358/455; 358/298
[58] Field of Search ............... 358/429, 448, 455, 456, 358/466, 426, 427, 444, 261.1, 261.2, 261.3, 262.1, 296, 298, 467, 443, 401, 500, 261.4

[56] References Cited

U.S. PATENT DOCUMENTS

| | | | |
|---|---|---|---|
| 4,110,795 | 8/1978 | Spencer | 358/429 |
| 4,525,729 | 6/1985 | Agulnek et al. | 358/298 |
| 4,573,133 | 2/1986 | White | 364/571.04 |
| 4,679,094 | 7/1987 | Rutherford et al. | 358/261.1 |
| 4,730,223 | 3/1988 | Ikeda et al. | 358/335 |
| 4,746,941 | 5/1988 | Pham et al. | 395/108 |
| 4,810,974 | 3/1989 | Hulbert et al. | 331/17 |
| 5,032,838 | 7/1991 | Murayama et al. | 358/261.1 |
| 5,056,154 | 10/1991 | Aono et al. | 358/429 |
| 5,126,759 | 6/1992 | Small et al. | 346/107 R |
| 5,138,316 | 8/1992 | Konish | 358/261.1 |
| 5,175,632 | 12/1992 | Hayashi et al. | 358/401 |
| 5,229,863 | 7/1993 | Kao et al. | 358/261.1 |
| 5,253,077 | 10/1993 | Hasegawa et al. | 358/404 |

FOREIGN PATENT DOCUMENTS

90/07753 12/1989 WIPO.
91/10311 1/1990 WIPO.
WO90/07753 7/1990 WIPO.

OTHER PUBLICATIONS

Patent Abestract of Jap., vol. 3, No. 304, Oct. 1987 and JP, A, 62 095 072 (Canon).
Patent Abstracts of Jap., vol. 14, No. 415, Jun. 1990, and JP, A, 02 159 616 (Fujitsu).

Primary Examiner—Richard Hjerpe
Assistant Examiner—Fan Lee
Attorney, Agent, or Firm—Norman Rushefsky

[57] ABSTRACT

An apparatus and method for processing image data operates in a high capacity or a high quality mode. In the former a single bit per pixel is created and processed along one of two identical processing paths. The processing paths involve compression, buffering and expansion for output to a writer interface. The processing path selected for pixels in each image frame is in accordance with the most available buffering memory. In the latter mode two bits per pixel, a more significant bit (MSB) and a less significant bit (LSB) are created and processed simultaneously along the two processing paths. The processing path for each is selected in accordance with the LSB being processed by the processing path with the most available memory. As compression of the LSBs is not as efficient as that of the MSBs, the number of document pages stored in the compression buffers is maximized.

24 Claims, 7 Drawing Sheets

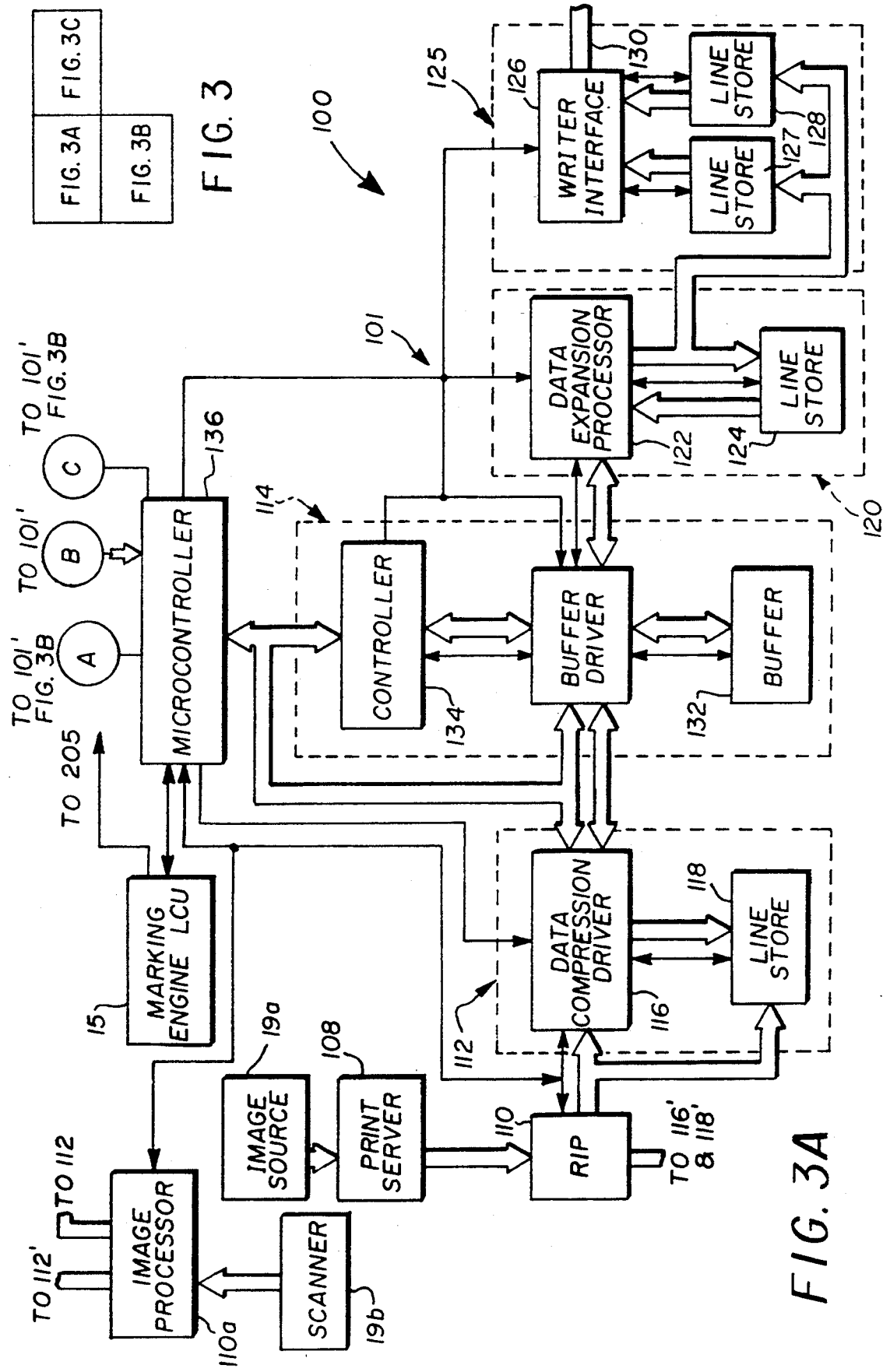

MARKING ENGINE FOR GREY LEVEL PRINTING HAVING A HIGH PRODUCTIVITY IMAGE DATA PROCESSING MODE

This application is related to the following U.S. applications filed on even date herewith:
1. U.S. application Ser. No. 07/982,547, filed in the name of James R. Prowak and entitled "Method and Apparatus for Resequencing Image Data for a Printhead";
2. U.S. application Ser. No. 07/982,365, filed in the names of Russell L. Godshalk et al and entitled "Method and Apparatus for Maximizing Data Storage in a Processor of Image Data".

FIELD OF THE INVENTION

The present invention relates to apparatus and methods for processing of grey level image data for non-impact recording apparatus.

DESCRIPTION RELATIVE TO THE PRIOR ART

In the prior art, it is known to use non-impact recording apparatus that employ laser, LED, thermal, ink-jet or other recording sources for respectively recording images on an appropriate medium by forming picture elements (pixels) of varying grey shades. Typically, the recording apparatus includes image processing means for generating a multibit image digital signal (MIDS) for each pixel to be recorded. In response to each MIDS, a pixel of a corresponding size or density is recorded on the medium and a number of pixels in the aggregate comprise a recording image that may be viewed or transferred to another medium for viewing. The recording apparatus may form a part of a copier wherein a multipage document to be copied includes an image scanner to transform the images on the document to electrical signals representative thereof. If multiple copies of the document are to be made and printed in collated order without more than one scan of each page of the original, it may be necessary for the copier to store the image data for all of the pages of the document. Where the stored data is more than one bit per pixel, such storage requirements may be excessive because of limited available memory and the job may need to be broken up differently through operator intervention. This is true even though the copier may include image compression circuits which can substantially reduce the amount of memory required to store a job.

SUMMARY OF THE INVENTION

It is therefore an object of the invention to increase capacity of the recording apparatus while also providing an ability to record very high quality images when required. These and other objects and advantages of the invention which will become apparent after reading of the description of a predefined embodiment of the invention are realized by a method for processing image data, said method comprising the steps of generating in a high quality printing mode, for each of first pixels to be recorded in one image frame, a multibit digital signal representing a grey level for recording such first pixels by a recording element; generating in a high capacity mode, for each of second pixels to be recorded in a second image frame, a single bit digital signal representing a grey level for recording such second pixels; and processing each bit of said multibit digital signal along a separate processing path.

In accordance with the invention, there is also provided a method and apparatus for processing image data, the method comprising the steps of generating a grey level of an image to be recorded, wherein N is an integer greater than one; and separately compressing, buffering and expanding a different one of said N digital bits.

BRIEF DESCRIPTION OF THE DRAWINGS

FIGS. 3, 3A, 3B and 3C represent a block diagram of a printer control system which includes an improved data processing circuit for processing data to the driver circuit of the print head of FIG. 2 in accordance with the invention.

DESCRIPTION OF THE PREFERRED EMBODIMENT

The apparatus of the preferred embodiment will be described in accordance with an electrostatographic recording medium. The invention, however, is not limited to apparatus for creating images on such a medium, as other media such as photographic film etc. may also be used within the spirit of the invention, as well as other recording modes, i.e., ink jet, thermal, electrographic, etc.

Because electrostatographic reproduction apparatus are well known, the present description will be directed in particular to elements forming part of or cooperating more directly with the present invention. Apparatus not specifically shown or described herein are selectable from those known in the prior art.

Figure 1:
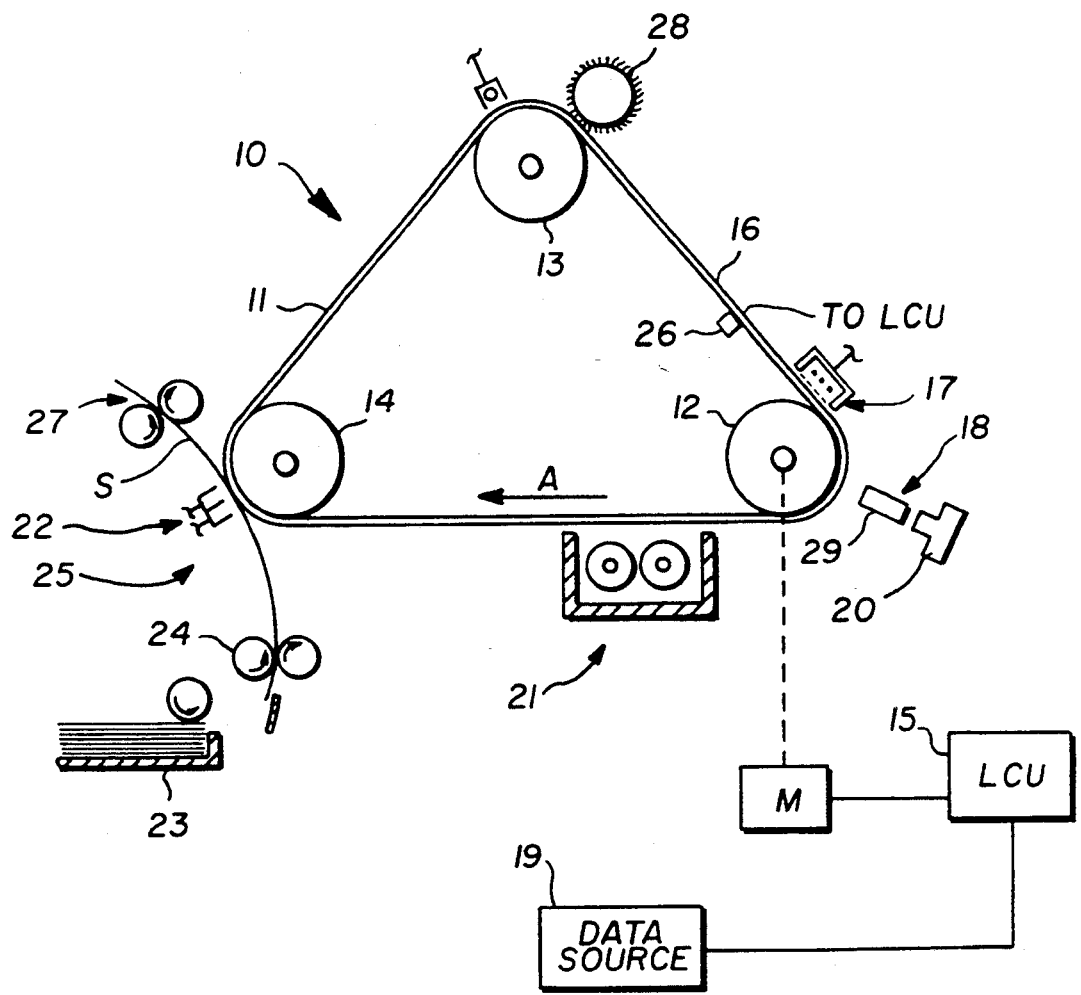
FIG. 1 is a schematic of a printing apparatus of the prior art.

With reference now to FIG. 1, an electrostatographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a signal from a logic and control unit (LCU) 15. When the switch is closed, the roller 12 is driven by the motor M and moves the web 11 in clockwise direction as indicated by arrow A. This movement causes successive image areas of web 11 to sequentially pass a series of electrophotographic work stations of the reproduction apparatus.

For the purposes of the instant disclosure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by an image data source 19 such as a document image scanner, computer work station, word processor, and the like. The print jobs may be queued in a print server, and spooled one page at a time to a raster image processor (RIP). The point-like radiation sources are supported in a print head 20 to be described in more detail below.

A development station 21 includes developer which may consist of iron carrier particles and electroscopic toner particles with an electrostatic charge suited for developing the latent electrostatic image, as is well known. Developer is brushed over the photoconductive surface 16 of the web 11 and toner particles adhere to the latent electrostatic image to form a visible toner particle, transferable image. The development station may be of the magnetic brush type with one or two rollers.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable means 26 for sensing web perforations. This sensing produces input signals into the workstation LCU 15 which has a digital computer, preferably a microprocessor. The microprocessor has a stored program responsive to the input signals for sequentially actuating, then de-actuating the work stations as well as for controlling the operation of many other machine functions. Additional or other encoding means may be provided as known in the art for providing the precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
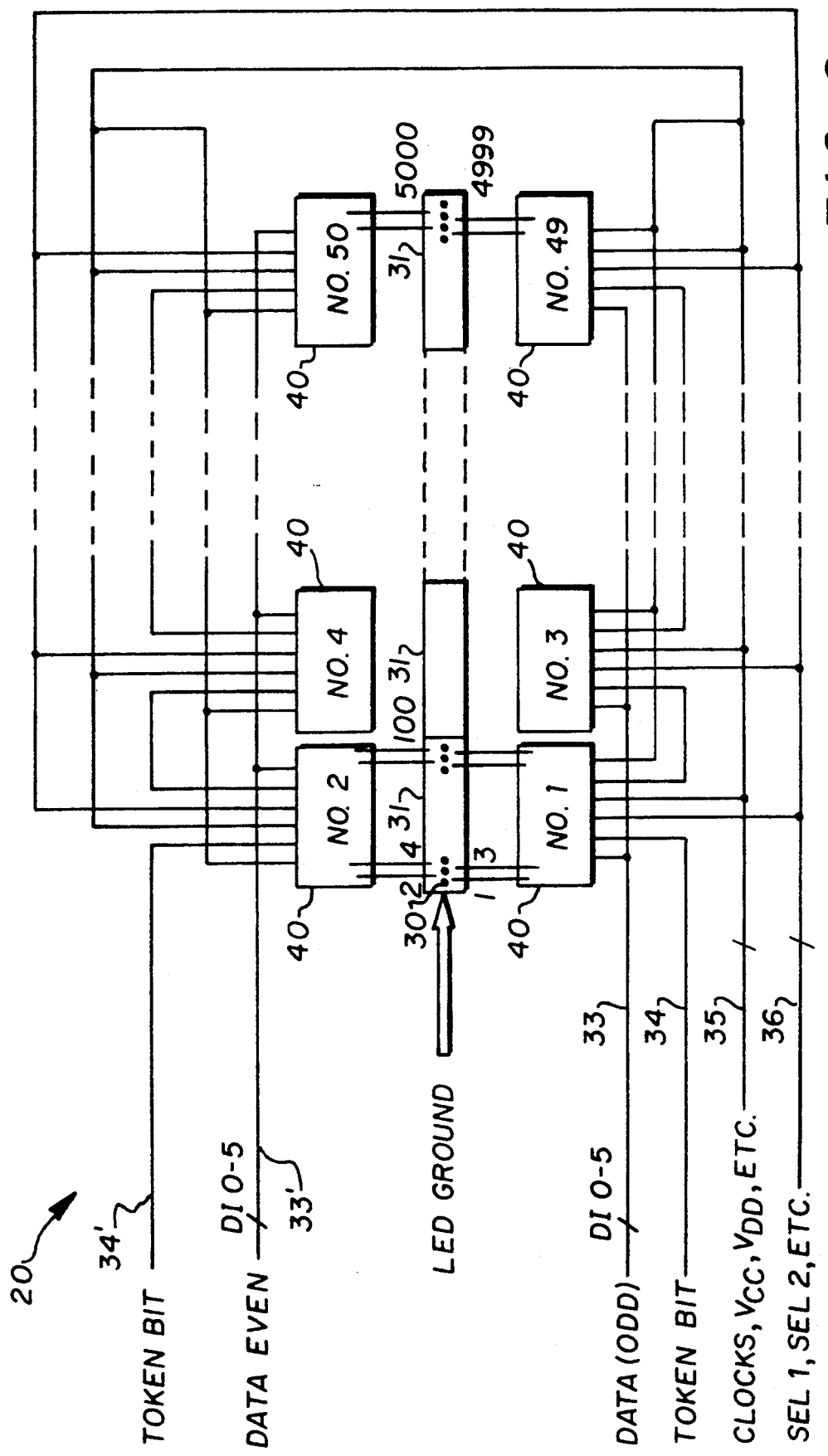
FIG. 2 is a block diagram of circuitry used in forming a print head of the apparatus of FIG. 1 in accordance with the prior art.

With reference to FIGS. 1 and 2, the print head 20, as noted, is provided with a multiplicity of energizable point-like radiation sources 30, preferably 5 light-emitting diodes (LEDs) arranged in a row although other recording devices such as thermal devices, liquid crystal display elements or needle electrodes are also contemplated. Optical means 29 may be provided for focusing light from each of the LEDs onto the photoconductive surface. The optical means preferably comprises an array of optical fibers such as sold under the name SELFOC, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Assume for purposes of facilitating discussion that each of the chips 31 includes in this example 100 LEDs arranged in a single row. Chips 31 are also arranged end-to-end in a row and where fifty LED chips are so arranged, the print head will extend across the width of the web 11 and include 5000 LEDs arranged in a single row. To each side of this row of LEDs there are provided in this example fifty identical driver chips 40. Each of these driver chips include circuitry for addressing the logic associated with each of 50 LEDs to control whether or not an LED should be energized or activated. Two driver chips 40 are thus associated with each chip of 100 LEDs. Each of the two driver chips will be coupled for driving of alternate LEDs. Thus, one driver chip will drive the odd numbered LEDs of the 100 LEDs and the other will drive the even numbered LEDs of these 100 LEDs. The driver chips 40 are electrically connected in parallel to a plurality of lines 33-36 providing various electrical control signals and potentials. A plurality of lines designated 35 provide electrical energy and ground for operating the various logic devices and current drivers in accordance with their voltage requirements and also provide clock signals and other pulses for controlling the movement of data to the LEDs in accordance with known techniques. A data bus 33 comprising data is provided for providing a 6-bit digital data or image signal. The 6-bit data signal represents an exposure duration for recording a single pixel during a pixel recording period as will be further described below. The driver chips each include a connection to this data bus to provide access to the data on this bus. A token bit signal on line 34 identifies a register within a particular driver chip that is associated with a particular LED to which the data pertains. In response to this token bit signal, this register latches the 6-bit data signal currently on the data line 33. Data on data bus lines 33 are provided in time sequential order so that data for LED #1 comes first, then data for LED #3 and so on for each of the odd-numbered LEDs up to data for LED #4999. Simultaneously, there is provided on data bus lines 33' data in sequential order for the even-numbered LEDs and latched in appropriate registers for these LEDs by a token bit signal on line 34'. Further details describing the driver chips is provided in U.S. Pat. No. 4,746,941, the contents of which are incorporated herein by this reference. Additional lines 36 such as providing various selection choices are further described in U.S. Pat. No. 5,126,759, the pertinent contents of which are also incorporated herein by this reference and in particular descriptive subject matter relative to architecture of a driver chip for receiving data and driving an LED with a multibit digital signal.

Figure 3B:
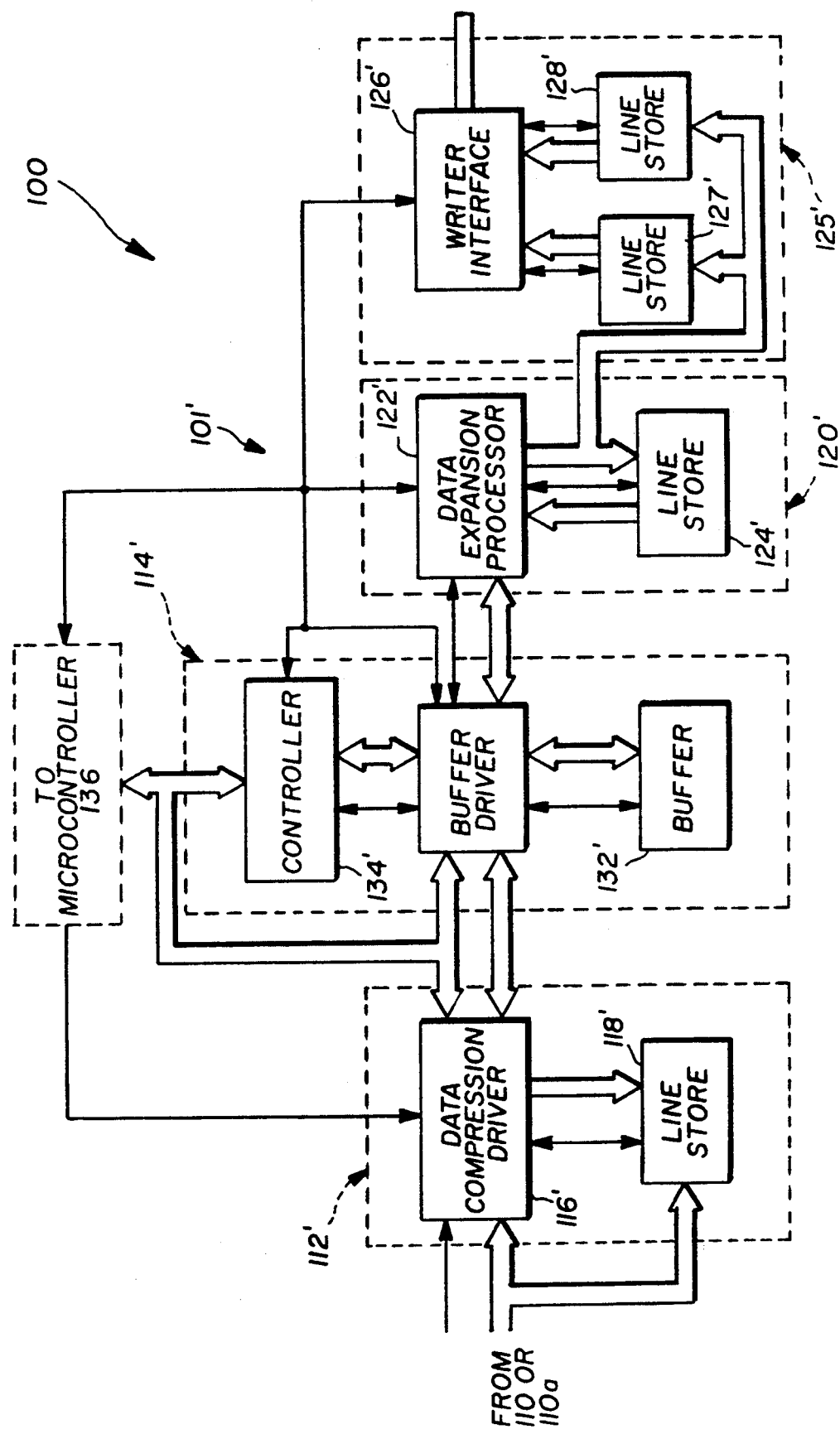

With reference now to FIGS. 3, 3A and 3B, a printer control system 100 is shown. The printer control system 100 is operable in conjunction with or disposed within the LCU 15 of the reproduction apparatus 10 as described previously with respect to FIG. 1. The printer control system 100 is therefore interconnected with the image source 19 and the print head 20. General motor control and control of other workstation functions as previously described with respect to the LCU 15 are thus unchanged.

In FIG. 3A, elements comprising a job image buffer or JIB 101 are interconnected by a series of data links shown as double-line arrows and control links shown as single-line arrows. Image data source 19 produces print jobs as either character code signals and/or pictorial signals from an image source 19a such as a computer or disk drive. Data source 19 also includes an alternate source of image data comprising a document scanner and image processor 110a. Processor 110a converts signals generated by the scanner which may be a CCD device, and converts same to rasterized digital signals. The rasterized digital signals represent data from a set of documents to be copied and which have been scanned by the scanner. The print jobs from image source 19a are queued in a print server 108, and spooled one page at a time to a raster image processor (RIP) 110. The RIP converts the code signals input thereto to a rasterized video data stream for printing pixel by pixel as described herein. Data signals from the image processor 110a also comprise a similar rasterized video data stream for printing pixel by pixel as also described herein. In one mode, referred to herein as the high quality mode, the data output from either the RIP or the image processor 110a is a 2-bit binary weighted digital signal representing a grey level for each pixel to be recorded. When output from the RIP or the image processor 110a, the 2-bit signal for each pixel is split and a decision made by microcontroller 136, as will be discussed below, that the lower significant bit (LSB) of each pixel is to be processed-say along the process path defined by JIB 101 and the more significant bit (MSB) is to be processed say along the process path defined by JIB 101'. As the two JIBs are substantially similar, description will now be made of JIB 101, it being understood that such description will also apply to JIB 101' whose similar elements are also indicated with a prime (').

The JIB 101 for the image frame being processed receives the image data stream of the LSBs from the RIP 110 or image processor 110a. The JIB 101 includes a data compressor 112, which is preferably a hardware implementation of an appropriate algorithm which encodes redundant information into a more compact form before passing the compressed data stream to a multi-page image buffer 114, also part of the JIB. Data compression algorithms are well known to those skilled in the art. One known algorithm is CCITT Group IV. Data compressor 112 includes a data stream compression driver 116 and a line store 118 for buffering a full line's worth of data of least significant bits.

An expander 120 is the companion to data compressor 112, and it includes a data expansion processor 122 and a line store 124. The expander retrieves the compressed data stream from multi-page image buffer 114 and reconstructs the output data into approximately original form as input to the data compressor 112. The data stream is transmitted to a data resequencing circuit 125 as sixteen-bit data words on a parallel data link. The resequencing circuit 125 is comprised of two resequencing line store devices 127 and 128 constructed according to the invention described in International application PCT WO 90/07753, the contents of which are incorporated herein, and a writer interface 126, and is also part of the JIB.

Multi-page image buffer 114 is provided for storing image data to permit the electronic recirculation of images for collation; thereby eliminating the need for a mechanical recirculating document handler. The heart of the JIB is a large bank of dynamic random access memory (DRAM) in a buffer 132 for storage of the image data as it is processed by data compressor 112. Alternatively, a disk may comprise the memory in buffer 132 or other mass storage devices may be used.

Controller 134 acts as a direct memory access controller, allowing data compressor 112 and expander 120 direct access to DRAM buffer 132 without a microprocessor, and as a DRAM controller arbitrating between memory read, write, and refresh cycles.

A microcontroller 136 functions as the system manager, overseeing the overall operation of the JIBS 101, 101'. The microcontroller will handle communication with the microprocessor of the logic and control unit (LCU) 15 of the marking engine, store the internal pointers identifying, for example, the beginning and ending addresses for each image frame, initiate transfers from the RIP 110 or image processor 110a, and control the data compression and expansion process.

The writer interface 126 receives a full line of image data (LSBs only) from the expander 120 after the line is processed by one of the pair of resequencing line stores 127 and 128. The resequencing line stores 127 and 128 are duplicate devices, each of which are operable for the resequencing of data.

It should be understood that the second of the two duplicate devices is also provided for operating upon a second line of data. Thus, in any two lines of data wherein the first line is presented by the expander 120 before the second line, the second line of data is being resequenced by one of the two resequencing line store devices 127 and 128 while the first line of data, already resequenced, is being output by the writer interface 126 to the additional or further resequencer of FIG. 3c. Accordingly, when a third line of data is then presented to the latter line store, the former line store is then delivering the resequenced second line from the writer interface 126 to the additional or further resequencer of FIG. 3c.

In accordance with the invention claimed in cross-referenced application Ser. No. 982,547, there are in this example 5000×2 bits of data or image signals to be resequenced for each line of rasterized image data. The 5000 lower significant bits of image data per data line exit the JIB 101 in groups or 4-bit nibbles of even/low, odd/low, even/high, odd/high ordered bits to a buffer 202 that forms a part of a further resequencer 130. The reason for this is due to the fact that the further resequencer 130 serves as a sequence modifier which modifies data otherwise sequenced for a printer system similar to that described in International Application PCT 90/07753. In this example, assume that the 4-bit nibbles of LSBs from JIB 101 are output as shown in buffer 202 (FIG. 3C) from address 0 up to n. Thus, data for LED #s 2500, 2499, 5000 and 4999 exit first as a 4-bit nibble, then data for LED #s 2498, 2497, 4998, 4997. The bits are ordered not only for distribution to odd and even-numbered LEDs but also for higher and lower numbered LEDs.

Figure 3C:
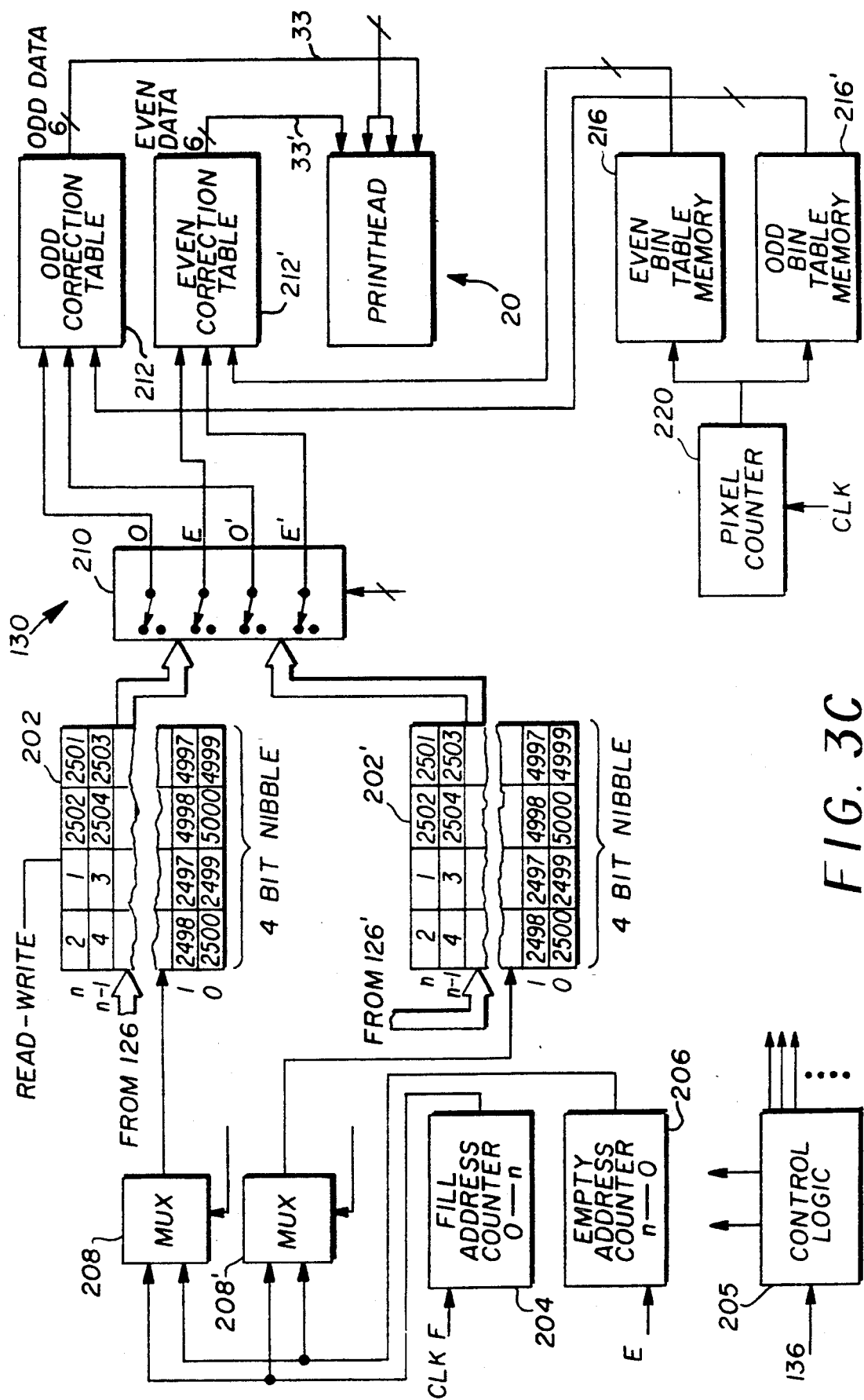
Figure 4A:
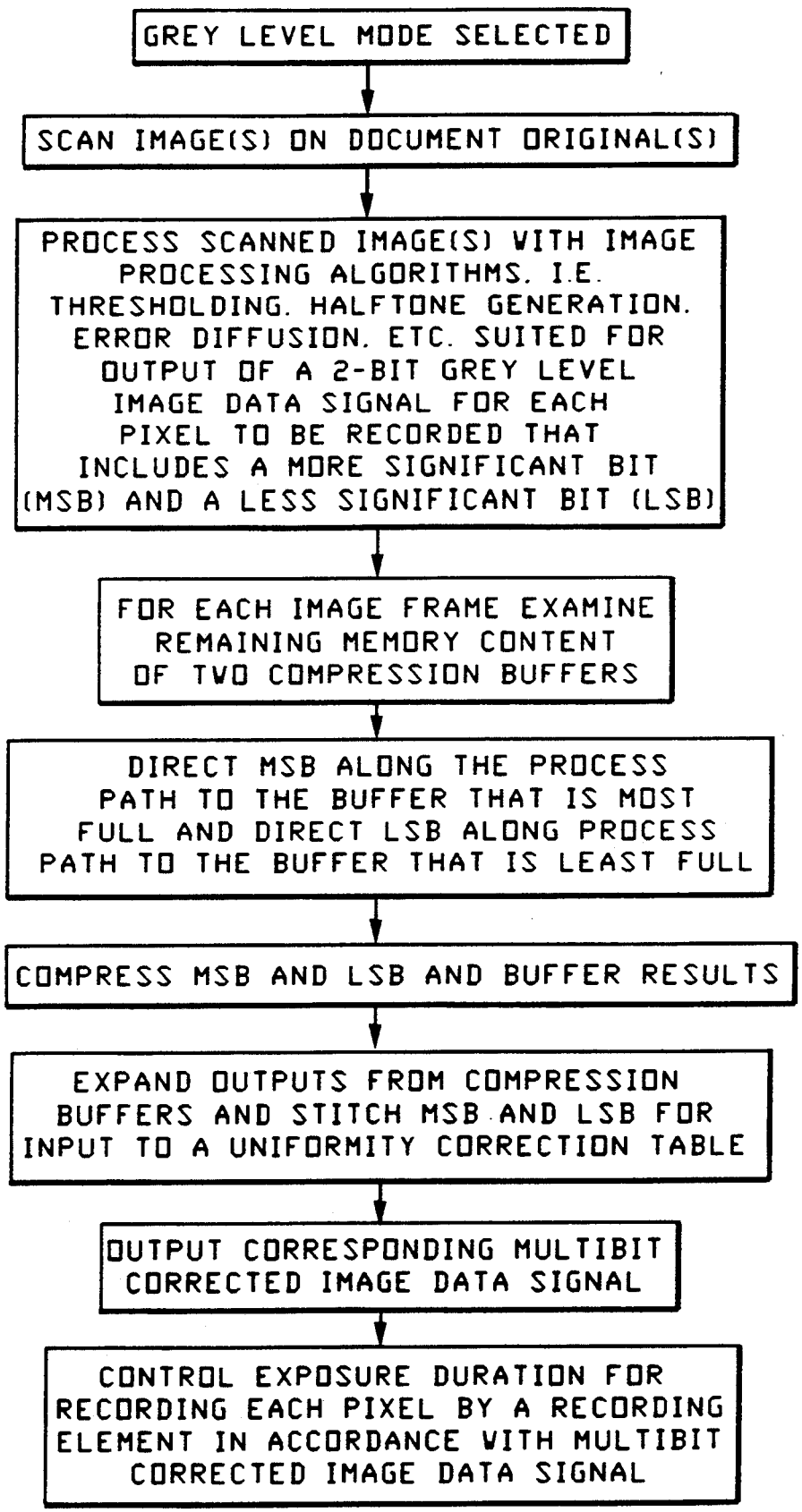
FIGS. 4A and 4B are flowcharts illustrating operation of the method and apparatus of the invention in various modes.
Figure 4B:
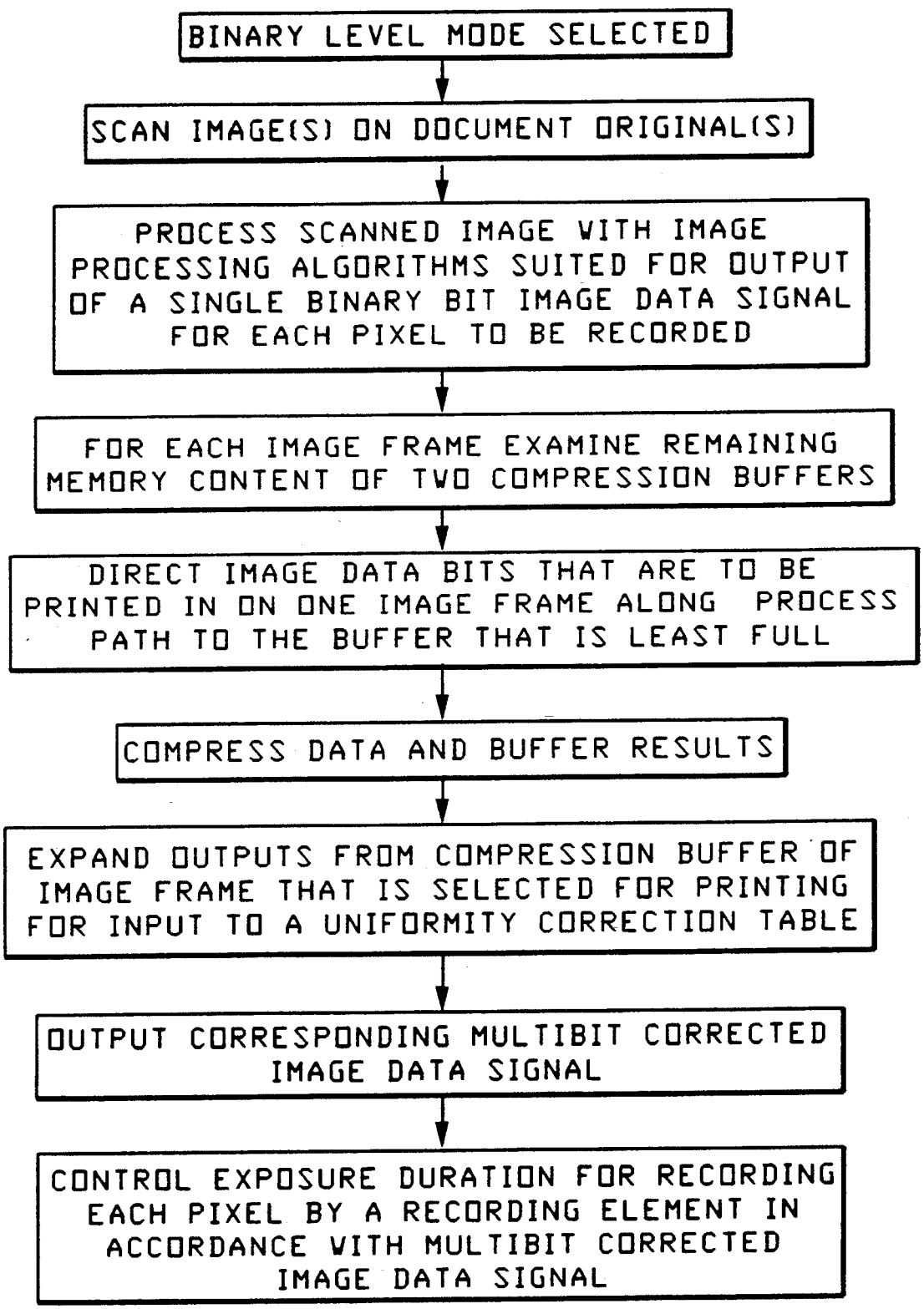

With reference now to FIG. 3c, data from the writer interfaces 126, 126' are stored in buffers 202, 202', respectively. The schematic illustration for buffers 202, 202' indicate the storage order for the pixel data for the particular LED. A fill address counter 204 counts clock pulses from the appropriate writer interface 126, 126'. A logic and control device 205 may also be provided and be controlled by microcontroller 136. The clock pulses are counted by counter 204 and the output thereof represents an address (from o–n) for successively accessing a 4-bit nibble storage area in each of buffers 202, 202'. In this example, assume each address of buffer 202 stores the less significant bits whereas buffer 202' stores the more significant bits of the 2-bit signal that represents a grey level signal for recording four pixels by four LEDs. As may be seen in the buffer 202, a 4-bit nibble is stored in the buffer as received from the writer interface 126 which is resequencing the data for a binary architectured printhead. In such a printhead, the data stream thereto is divided into odd and even pixel data and high and low numbered pixel data. The former is done to accommodate and fill the odd and even driver chips 40 simultaneously. The latter is done to further speed the data flow to the prior art binary architectured printhead by sending data simultaneously to front and back halves of the printhead. As known in the art, a binary architectured printhead employs only a single digital data bit to determine exposure or non-exposure thereof for recording a pixel. Duration of exposure is controlled by non-image data signals such as strobe line(s) etc. In a grey level printhead such as described with reference to FIG. 2 and the patent documents incorporated by reference, a grey level printhead uses a plurality of data bits to control either exposure duration or intensity. The further resequencing device 130 serves to resequence for a grey level printhead the single bit data originally sequenced for a binary architectured printhead. The invention described herein is not limited to the sequence of data forwarded to the printhead.

As each 4-bit nibble is output from writer interfaces 126, 126', these outputs are stored in buffers 202, 202' in a sequence starting with address o up to n; in this case n will equal 1249 where there are 5000 LEDs. The buffers 202, 202' are shown for purposes of facilitating discussion as being addressed by counter 204 via respective multiplexers 208, 208'. This is done to permit synchronous addressing of the two buffers 202, 202' so that buffers 202, 202' can be filled simultaneously from respective JIBS 101, 101'. However, it is preferred to provide an additional pair of buffers similar to those of 202, 202' and this additional pair can be addressed by a separate fill address counter to permit asynchronous loading of data into buffers from JIB 101, 101'. Thus, while buffer 202 and its complementary pair are being loaded asynchronously, buffer 202' and its complementary pair could be unloaded synchronously via common addressing by empty address counter 206. The multiplexer also provides for selection of whether the fill address counter address output by counter 204 or the empty address counter address 206 is to be output to the respective buffer. After the buffers 202, 202' are filled with their respective data nibbles, a signal from the control logic 205 changes the output of the multiplexer to provide output of the n–o empty address counter 206. Multiplexer or data link 210 also under control of a control signal from control logic 205 receives at its inputs the two 4-bit wide nibbles of data that are read at the address location addressed by empty counter 206. Initially, the first nibble read from address "n" will include data bits for LEDs 2, 1, 2502, 2501. The output of the multiplexer or datalink 210, however, will be switched so as only to accept the data bits from buffers 202, 202' for LEDs #1 and #2, both low and high significant bits for each LED. Thus, the data bits for LEDs 02502 and 2501 are not output by multiplexer 210 at this time. As LED #1 is an odd-numbered recording element, the now-combined or stitched 2-bit grey level signal for LED #1 is input to an odd correction table memory 212. In this memory there is stored correction data for each of the odd-numbered LEDs. Thus, for LED #1 for each of the possible four grey level pixels (counting white) that the 2-bit signal will represent there is stored a corresponding corrected 6-bit image data signal that represents an exposure duration for that LED for recording a pixel of that grey level. This 6-bit signal includes correction for nonuniformities between the LEDs as described in accordance with the teachings of PCT International Application WO 91/10311, the contents of which are also incorporated herein by this reference. The corrected 6-bit signal is then output to the printhead 20 with a token bit signal as described above for latching by a register on a driver chip 40 associated with LED #1. Simultaneously, the 2-bit data signal for LED #2 is output to the even correction table memory 212' which is similar to that of table memory 212 but stores corrected data for the even-numbered LEDs. A pixel counter 220 under control of control logic 205 counts clock pulses which indicate an LED or pixel count starting with the number 1 and ending with 2500. As there are 2500 each of the odd and even-numbered LEDs, this count simultaneously represents both and can be used as an address in table memories 212, 212' to identify the data stored in these memories for that particular LED that is to have its input 2-bit grey level signal corrected to a 6-bit signal.

In order to reduce the size of each correction table memory, it may be desirable to consider that some LEDs may be similar to others in respect to performance and that the pixel counter 220 may be used as shown in FIG. 3C to access a code in table memories 216, 216' representing those having a similar performance characteristic. This code could then be output to smaller correction table memories 212, 212' which also receives at its input the 2-bit grey signal.

The corrected 6-bit data signal for LED #2 is sent on the even data bus 33' simultaneously with sending of the 6-bit data signal for LED #1 on the odd data bus 33. The empty counter is then decremented to address n–1 to access the 2-bit data signal for each of LEDs 3 and 4 in buffers 202, 202' and so on. After the empty address counter reaches 0 to access the data for LEDs 2499 and 2500, the empty address counter 206 is reset back to address n and the multiplexer 210 switched to output the data for the high-numbered LEDs. Thus, at address n, data for LEDs 2501, 2502 will be output from table memories 202, 202' to the correction table memories. The pixel counter 220 will now count 1251 and as the empty address counter again decrements from n to o, the pixel counter 220 continues to increment from 1251 to 2500. Thus, a line of 5000×6-bit data signals are sent on the respective data busses for latching by the registers in the driver chips for printing a line of grey level pixels.

The above discussion is directed to operation of the printer and printer control system in a two-bits per pixel grey level mode wherein a source of raw image data is obtained by scanning an image on an original document using a CCD or other device or obtaining such information from a computer file. The raw data is processed as is typical by subjecting same to various image processing algorithms, i.e., thresholding, halftone generation, error diffusion suited for output on a rasterized image data signal to a grey level printhead. Thus, a multibit digital data signal from a document scanner can be subjected to thresholding by comparing same to say three fixed threshold values to determine a two-bit grey level signal for such data signal. The two-bit signal comprises a more significant bit (MSB) and a less significant bit (LSB). As noted above, the two-bits are separated and processed by essentially similar separate processing paths or circuits wherein each bit that is associated with the same document is subjected to compression, storage, expansion and then stitched with the corresponding other bit of that pixel for input to an LUT to determine the corresponding corrected grey level data signal for recording that pixel by the particular LED that is to be used to record same. As used herein, pixels associated with a document refer, not necessarily to all pixels on a document original or a printed copy thereof, but to all pixels that are to be printed on a single image frame of the printer apparatus. Thus, where a printed document is to be produced and wherein the sheet includes different colors, the printer apparatus could record portions of the image on different image frames and develop such image frames, respectively, with differently colored toners and transfer the two or more developed images in register to a receiver sheet to form a composite plural color image.

In accordance with the invention, the operator through an input provided on an operator control panel for the copier may select a high capacity mode. In the high capacity mode, the RIP 110 or image processor 110a includes circuitry or software for transforming an input multibit signal into a rasterized single bit per pixel or binary pixel. Such circuitry in the image processor 110a could include establishing a threshold level for determining a print or no print decision for creating a binary pixel, as well as halftone algorithms and error diffusion. The microcontroller 136 would then direct the RIP 110 or image processor 110a to output rasterized binary bits either to JIB 101 or 101'. Again, all the rasterized pixels associated with a particular image frame are forwarded to the same JIB and the microcontroller 136 keeps track of which JIB, 101 or 101', each frame of rasterized pixels is located in. The microcontroller 136 also is responsive to signals from controllers 134, 134' as to the remaining amount of memory space in each buffer 132, 132'. These signals can be the respective addresses to which the last image frames were input into buffer memories 132, 132'. As data for each new image frame is processed by either RIP 110 or image processor 110a, the microcontroller 136 in response to signals from controllers 134, 134' relative to remaining buffer memory 132, 132' directs either the RIP 110 or image processor 110a to transfer the data to the JIB 101, 101' having the most amount of available memory. The single bits of data associated with this particular image frame are then subjected to compression, storage and expansion as discussed above. The expansion will be made upon a signal from microcontroller 136 that the particular frame is to be output from the buffer memory 132, 132' to prepare same for printing. After expansion in the appropriate expander 120, 120', the data is processed by the writer interface 126, 126' and output to the resequencer 130. The rasterized single-bit data is stored in one of the buffers 202, 202'. The data is then output from the buffer 202 or 202' in accordance with the resequencing process discussed above except that there is no need to stitch an LSB with an MSB in this single bit image data mode. There is a need in this example, however, to output the data to the correction tables 212, 212' to generate a multibit digital data signal that corrects for nonuniformity in LEDs. In this regard, the control logic 205 may provide a signal to the correction table indicating that this is the single bit mode so that different correction factors may be used in the two bits per pixel mode. The corrected image multibit image data signal is now transmitted to the printhead in the correct sequence as described above for the two-bit grey level case for printing by the grey level printer 20.

In the case where the high quality mode is selected, i.e., where the grey level of each pixel to be recorded is defined by two-bits of data, the controllers 134, 134' provide signals to the microcontroller 136 as to the amount of remaining memory in buffers 132, 132'. For each new image frame being processed, the microcontroller, in response to a signal from the controllers 134, 134' representing memory already occupied or remaining in each buffer 132, directs either the RIP 110 or image processor 110a to transmit the LSBs to the JIB 101, 101' with the most remaining memory. As noted above, the addresses to which the last image frames were placed in buffer memories can be used to indicate remaining memory in each buffer memory. The reason for this is that, as there is separate compression of LSBs and MSBs, the LSBs being more busy do not compress as well as the MSBs and thus require more memory. The reason for this is that the particular algorithm used is less efficient when there are many density transitions. Therefore, the compression of the LSBs takes up more buffer memory. If the compressed LSBs were always directed to the same memory, the LSB memory would fill long before that of the MSB and result in inefficient use of memory space. The invention in cross-referenced application Ser. No. 982,365 contemplates broadly that, where the processing of one bit of a multibit signal would be more efficiently processed along one processing path, that the control logic or program be optimized to adjust for such efficient processing.

In order to increase productivity, the resequencer may have a duplicate buffer for each of buffers 202, 202' so that as data is being input to one set of buffers 202, 202' from the writer interfaces 126, 126', the other set of buffers may have its data sent to the printer via correction tables 212, 212'.

The teachings of the invention claimed in cross-referenced application Ser. No. 982,365, regarding selection of a processing path for efficient use of memory, are also applicable to processing data for a binary printhead. Thus, the data can be removed from a memory such as memory 127 or 128 as described above and sent directly to a binary printhead without the addition of correction information to the data and without combining or stitching such binary data with data from memory 127' or 128'. The printhead would receive only a single data bit for each pixel and the exposure time determined by a strobe signal as is conventional for binary architectured printheads.

In a further modification, the grey level printhead can be operated in a binary or single bit mode wherein the data bits stored in memory 202 in the order shown in FIG. 3C represent the single image data bits for one line of pixels and those stored in memory 202' are the corresponding ones for the next line of pixels. In such a mode the operation is similar to that described above except that in the single bit mode, the multiplexer 210 is programmed not to pass data from memory 202' when the empty address counter 206 is addressing memory 126 and vice versa. In addition, the correction table memories 212, 212' may be programmed in such a mode to provide correction data suited for recording an average density pixel for that LED.

Generally, in accordance with the above teaching, it can be shown where N recording elements are considered as being grouped in M groups, that the memories 202, 202' can each be emptied M times so that in a first round data for recording elements 1 through N/M are emptied, then in a second round data for (N/M) +1 through 2N/M, then data for (2N/M)+1 through 3N/M and so on until emptying of data for the final group [(M−1)N/M]+1 through N. In such grouping, odd and even data can be considered in the same group and are simultaneously extracted in pairs.

The invention has been described with regard to operating on two bits per pixel data signals by directing these bits to separate processing paths. In its broader aspects, the invention contemplates that signals with more than 2 bits may be processed along different processing paths. Thus, where data signals of four bits per pixel are being processed the data can be processed by four processing paths of the type described herein with the buffer memory having the most available memory handling the bit which compresses least efficiently and the memory having the next most available memory handling the bit which is next most efficient in compression, and so on.

As an alternative, the multibit per pixel image data from the RIP 110 and/or image processor 110a may be in Gray code instead of binary coded. In the case of 2 bits per pixel image data, the LSB in Gray code compress somewhat more efficiently with the noted compression algorithm but there are still advantages for processing the LSB along the path having the most available buffer memory. However, in a 4 bits per pixel grey level system and/or with use of other compression algorithms, each of the Gray coded data bits may be separately processed with reasonable efficiency along fixed or dedicated processing paths of the type described herein without need for switching or ping-pong processing of the LSBs to the path containing the most available memory. With such Gray coding of data, the buffer memories may be found to fill generally uniformly because of the nature of the code.

In still a further modification and where a compression-expansion algorithm is operable on say 2 bits, a 4 bits per pixel data systems may be processed by breaking up the 4 bits into segments of two bits (higher and lower) and processing the data along two parallel processing paths.

In a further embodiment, alternate switching of processing paths may be done so that for one image frame or even a portion thereof whose size is dependent upon compression efficiency, the LSBs and MSBs are processed along first and second respective paths and for a second image frame or portion thereof of pixels, the processing is reversed with LSBs and MSBs processed along second and first paths, respectively.

Advantages

The invention thus provides for operation of a copier/printer in a high productivity mode wherein fewer bits, for example, a single bit per pixel, need be processed and thus provides for a high storage capability. In addition, high quality recording using multiple bits, such as two bits, per pixel may also be made. The invention also allows for single bit copier/printers to be upgraded into plural bit copier/printers by merely duplicating much of the existing circuitry, thus saving development time and cost.

The invention has been described in detail with particular reference to preferred embodiments thereof, but it will be understood that variations and modifications can be effected within the spirit and scope of the invention.

We claim:

1. A recording apparatus that selectively processes image data in either a high quality processing mode or a high capacity processing mode, said apparatus comprising:

A. first processing means for processing image data representing all pixels of a first image in a high quality processing mode for recording said image on a first image frame, said first processing means including (a) first generating means for generating multibit first digital signals each of N bits representing a grey level of each of the pixels to be recorded on the first image frame, wherein N is an integer greater than one;

(b) first operating means for operating upon respective first portions of said N bits of said multibit first signals and generating second signals representing a compressed form of said first portions;

(c) first memory means for storing said second signals;

(d) second operating means for operating upon respective second portions of said N bits of said multibit first signals and generating third signals representing a compressed form of said second portions;

(e) second memory means for storing said third signals;

B. second processing means for processing image data representing all pixels of a second image in a high capacity processing mode for recording said second image on a second image frame, said second processing means including second generating means for generating fourth digital signals each of M bits representing a grey level of each of the pixels to be recorded on the second image frame, wherein M is an integer less than N and wherein said first operating means includes means for operating upon the entire M bits of the fourth signals to generate fifth signals representing a compressed form of said M bits and said first memory means stores said fifth signals; and recording means responsive to said second and third signals for operating a recording element for recording an image on the first image frame and responsive to the fifth signals for operating the recording element for recording an image on the second image frame.

2. The apparatus of claim 1 and wherein N is two and M is one.

3. The apparatus of claim 2 and wherein N is equal to two and said first operating means and second operating means each include means for compressing, buffering in compressed form and expanding one bit of two bits representing a grey level of a pixel.

4. The apparatus of claim 3 and including means for correcting a two bit expanded grey level signal into a multibit corrected grey level signal for each pixel wherein the multibit corrected signal is of more than two bits.

5. The apparatus of claim 4 and including means for controlling an exposure parameter of a recording element in response to said multibit corrected signal.

6. An apparatus for processing image data, said apparatus comprising:
   first means operative in a high quality mode for generating multibit digital signals each of N digital bits representing a grey level of each pixel of a first image to be recorded, wherein N is an integer greater than one; and N parallel processing means each for separately compressing, buffering and expanding a different one of said N digital bits; and
   second means operative in a high capacity mode for generating pixels of a second image to be recorded wherein each pixel is represented only by a single digital bit and directing all pixels of said second image for processing in only one of said N parallel processing means.

7. The apparatus of claim 6 and wherein means said digital signals represent binary weighted pixels to be recorded in a same image frame and a particular one of said N processing means processes all bits of a particular binary weight of said multibit digital signals.

8. The apparatus of claim 7 and wherein N is two.

9. The apparatus of claim 7 and wherein a buffer in each of said N processing means is a multipage buffer.

10. The apparatus of claim 6 and wherein the first means for generating generates the multibit digital signal in Gray code.

11. A method for processing image data, said method comprising the steps of:
   processing an image signal, representing all the pixels of a first image to be recorded on one image frame of a recording medium, in a high quality processing mode and generating multibit digital signals each of N bits representing a grey level of each of the pixels to be recorded on the one image frame, wherein N is an integer greater than one;
   operating upon one bit of said N bits for each of said pixels and generating a set of first signals and storing said first signals in a first memory;
   operating upon another bit of said N bits for each of said pixels and generating a set of second signals and storing said second signals in a second memory;
   processing an image signal representing all the pixels of a second image to be recorded on a second image frame of the recording medium, in a high capacity mode and generating digital signals each of less than N bits representing a grey level of each of the pixels to be recorded on the second image frame;
   operating upon each of said digital signals of less than N bits for each of said pixels of said second image and generating a set of third signals and storing said set of third signals in said first memory; and
   in response to said first and second sets of signals recording the first image and in response to said set of third signals recording the second image.

12. The method of claim 11 and wherein N is two and said signals of less than N bits are one bit each.

13. The method of claim 12 and including the steps of compressing, buffering in compressed form and expanding one bit of the two bits representing a grey level of a pixel and compressing, buffering in compressed form and expanding a second bit of the two bits representing the grey level of the pixel.

14. The method of claim 13 and including correcting the one bit grey level signal into a multibit corrected grey level signal for each pixel to be recorded in the second image frame wherein the multibit corrected signal is of more than one bit.

15. The method of claim 14 and including controlling an exposure parameter of a recording element in response to said multibit corrected signal.

16. A method for processing image data in first and second modes, said method comprising the steps of:
   processing data in a high quality mode by generating multibit digital signals each of N digital bits representing a grey level of each pixel of a first image to be recorded, wherein N is an integer greater than one; and separately compressing, buffering and expanding a respective different one of said N digital bits in respective N parallel processing devices; and
   processing data in a high capacity mode for a second image to be recorded by generating pixels to be recorded wherein each pixel is represented only by a single digital bit and directing all pixels of said second image for processing in only one of said N parallel processing means.

17. The method of claim 16 and wherein said digital signals are binary weighted pixels to be recorded in a same image frame and one of said N processing devices processes all bits of one binary weight of said multibit digital signals.

18. The method of claim 16 and wherein N is two.

19. The method of claim 16 and wherein said digital signals are binary weighted pixels to be recorded in a same image frame and the binary weighted pixels of one binary weight are stored in a page buffer in each of the N parallel processing devices.

20. The method of claim 16 and wherein the multibit digital signal is in Gray code.

21. A method for processing image data, said method comprising the steps of:
   generating in a high quality printing mode, for each of first pixels to be recorded in one image frame, a multibit digital signal representing a grey level for recording each of such first pixels by a recording element;
   generating in a high capacity mode, for each of second pixels to be recorded in a second image frame, a single bit digital signal representing a grey level for recording each of such second pixels; and
   processing each bit of said multibit digital signal along a separate processing path.

22. The method of claim 21 and wherein each of the processing paths includes the steps of compressing, buffering and expanding.

23. The method of claim 22 and wherein one of said processing paths also processes said single bit digital signal.

24. The method of claim 21 and wherein one of said processing paths also processes said single bit digital signal.

* * * * *